United States Patent [19]
Giles et al.

[11] 3,852,532
[45] Dec. 3, 1974

[54] CONTROL SYSTEM FOR AN ELECTRICAL POWER LINE

[75] Inventors: Ronald L. Giles, Altavista; Daniel L. Wetherell, Lynchburg, both of Va.

[73] Assignee: General Electric Company, Lynchburg, Va.

[22] Filed: May 30, 1973

[21] Appl. No.: 366,075

[52] U.S. Cl. ........... 179/2 R, 179/15 BP, 340/147 F
[51] Int. Cl. ............................................ H04q 9/00
[58] Field of Search.... 179/2 A, 2 R, 84 VF, 15 BP, 179/2.5 R; 317/9 A, 9 D, 9 R; 340/147 F, 171 R

[56] References Cited

UNITED STATES PATENTS

| | | | |
|---|---|---|---|
| 3,742,440 | 6/1973 | Ehrlich et al. | 340/147 F |
| 3,768,021 | 10/1973 | Ramaswany et al. | 179/15 BP |

*Primary Examiner*—Kathleen H. Claffy
*Assistant Examiner*—Tommy P. Chin

[57] ABSTRACT

Control for an electrical power line usually requires that conditions at one location on the line be sensed and sent as signals over a communication channel to another location on the line where an operation, such as the tripping of a circuit breaker, must be effected in response to the signals. Generally, this communication channel is subject to noisy conditions, and will be exposed to extraneous and undesired signals. But the essential reliability of the power line requires that the operation shall not occur unintentionally and that the operation shall occur when signals are sent over the communication channel, both despite poor conditions of the channel. This control system provides a transmitter (at the one location) which shifts two guard tones to two different trip tones and which increases the level of a pilot tone when tripping is desired. The control system further provides a receiver (at the other location) which must be unsquelched and which must receive the two trip tones before it will produce the trip indication. The receiver is unsquelched only if the pilot tone is at the proper frequency and it exceeds the magnitude of a medium band of frequencies on the channel by a predetermined amount, and if the magnitude of a wide band of frequencies on the channel does not exceed the pilot tone magnitude by more than a predetermined amount.

6 Claims, 5 Drawing Figures

CONTROL SYSTEM FOR AN ELECTRICAL POWER LINE

BACKGROUND OF THE INVENTION

Our invention relates to an improved control system for electrical power lines, and particularly to such a control system that operates reliably in response to selected tones but which does not operate otherwise, even under relatively adverse and noisy conditions.

In the distribution of power, generated power is sent from a source down a line to a substation where the power may be sent down other lines to additional substations. Because of the dependence on electrical power, it is essential, or at least highly desirable, that the electrical power lines and equipment be as reliable as possible, and continue to operate unless a destructive condition exists. If a fault or malfunction develops on the lines or in the equipment, it is desirable that an indication of this fault be sent up the line (that is toward the source of power) in order to trip a circuit breaker that disconnects the line from the rest of the system so as to prevent destruction of the line or equipment and so as to preserve the operation of the rest of the system. If the fault or malfunction is one which, by predetermined judgement, requires that a line circuit breaker should be tripped, then reliable tripping must take place. But if there is no fault or malfunction, then no tripping must be assured.

Accordingly, a primary objective of our invention is to provide a new, improved, and more reliable control system for relaying information or signals which are used to control electrical power, such as by tripping a circuit breaker.

Electrical power companies use various means to transmit control signals from one location to another. Such means may be a carrier system over the electrical power lines themselves, or may be owned or leased telephone lines, or may be radio transmission systems, or may be any combination of these communication means. However, since the signals calling for a control function or operation originate in an extremely noisy location, generally a high voltage, 60 hertz electrical substation or switchyard, the communication channel is subjected to severe electrical noises and voltage surges. But it is essential that such noises and surges not be able to produce a signal which erroneously appears to be the signal calling for an operation, such as tripping a circuit to open a power line.

Accordingly, another primary object of our invention is to provide an improved control system that can be used with electrical power distribution systems and that provides excellent immunity from noises and surges that could produce a false indication.

Another object of our invention is to provide an improved control system, for use with an electrical power distribution system, that provides relatively reliable and sure operation when a control function is desired, despite surrounding noise and voltage surges.

And where some part or all of the communication channel may receive tones inadvertently, such as by a mistake in a telephone central office, another object of our invention is to provide an improved control system which is relatively immune to most or all inadvertent applications of such tones to the communications channel.

SUMMARY OF THE INVENTION

Briefly, these and other objects are achieved in accordance with our invention by a control system that utilizes a communication channel extending between two locations in an electrical power system. Transmitting means are provided at one location for transmitting a pilot tone over the communication channel, two guard tones over the communication channel in response to proper operation of the power system at the one location, and two trip tones over the communication channel in place of the two guard tones in response to a control indication (or trip signal). Receiving means are provided at the other location on the power system and are connected to the communication channel. The receiving means comprise: a narrow band filter for receiving substantially only the pilot tone from the communication channel; a medium band filter for receiving a medium band of frequencies, other than the pilot tone, from the communication channel; and a wide band filter for receiving a wide band of frequencies from the communication channel. A squelch receiver is connected to the three filters, and provides an unsquelch signal only in response to receiving the pilot tone, and in response to the pilot tone magnitude being at least a predetermined amount greater than the medium band filter frequency magnitude and the side band filter frequency magnitude being no more than a predetermined amount greater than the pilot tone magnitude. If any one or more of these conditions are not met, the squelch receiver produces a squelch signal. First and second trip receivers with respective trip filters are provided in the receiving means for respectively receiving the first and second trip tones. The first and second trip receivers are controlled by the squelch receiver, and permit the trip tones to pass only in response to an unsquelch signal from the squelch receiver, and block the trip tones in response to a squelch signal. Utilization means, such as logic circuits, are connected to the trip receivers and produce a control or trip signal in response to receipt of signals from the trip receivers.

Thus, in order for a control or trip signal to be produced, the pilot signal tone be received on frequency, the pilot tone must have a predetermined magnitude relation with the medium band filter signal magnitude and the wide band filter signal magnitude, and both trip tones must be received. These requirements provide a control system which con work under extremely noisy conditions, and which is immune to any two inadvertently applied tones from the following: the pilot tone, the first trip tone, and the second trip tone.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
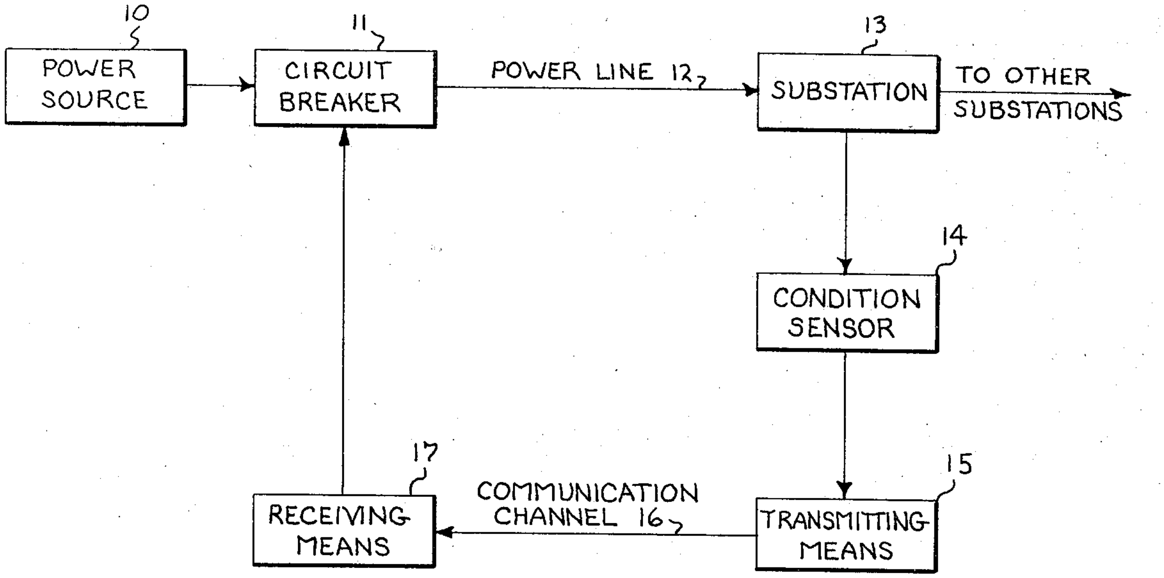
FIG. 1 shows a block diagram of a portion of an electrical power line which is provided with our improved control system.

In FIG. 1, we have shown, by way of example only, an electrical power line or system with which our invention can be used. It is to be understood, however, that our invention can be used in other applications where reliable control signals must be received over a communication channel that is exposed to noise, voltage surges, and inadvertently applied tones. In FIG. 1, we have assumed that a 60 Hz electrical power source 10 is connected through a protective circuit breaker 11 to a power line 12 for distribution. We have shown the power line 12 extending to one distant substation 13, but it is to be understood that the power line 12 may also connect to other substations. In addition, the substation 13 may also connect to other substations not shown. In such a power system as shown and described, reliability is extremely and vitally important. The system should be operative and supply electrical power from the source 10 to the substation 13 unless a serious malfunction or fault is detected or sensed. Then, in order to protect the electrical system, the power line 12 should be removed from service. As is known in the art, a condition sensor 14 is provided at the substation 13 to sense or detect faulty operation or failure of equipment, and provide an indication which can be sent to the location of the circuit breaker 11. This is done by transmitting means 15 which convert these indications from the sensor 14 to tones or trip frequencies for application to a communication channel 16. This channel 16 extends from the transmitting means 15 at the substation 13 to receiving means 17 located at or in the vicinity of the circuit breaker 11. The communication channel 16 may utilize various mediums, such as a power line carrier system which is transmitted over the power line 12 itself, or telephone wires, or a radio link, or any combination of these three mediums. But regardless of what medium the communication channel 16 utilizes, it should provide reliable transmission of the tone from the transmitting means 15 to the receiving means 17. In practical situations, the channel 16 is exposed to high sources of noise such as high voltages of the 60 Hz power system or lightning, or something else. If the communication channel 16 utilizes telephone lines, telephone testers or servicemen have been known to inadvertently apply tones or sine wave frequencies to the telephone line, and these tones or frequencies provide or result in improper operation. Hence, a reliable control system is desirable. Where large amounts of electrical power are concerned, a reliable control system is mandatory. When a reliable control system is provided, the power companies can be assured that signals calling for a control function, such as tripping or opening the circuit breaker 11, can be reliably transmitted under adverse and noisy conditions. The power companies can also be assured that there is very little or no chance of unintentional or inadvertent frequencies or tones being applied to the communication channel to ooen or trip the circuit breaker 11 while the power distribution equipment is operating properly and normally.

Figure 2:
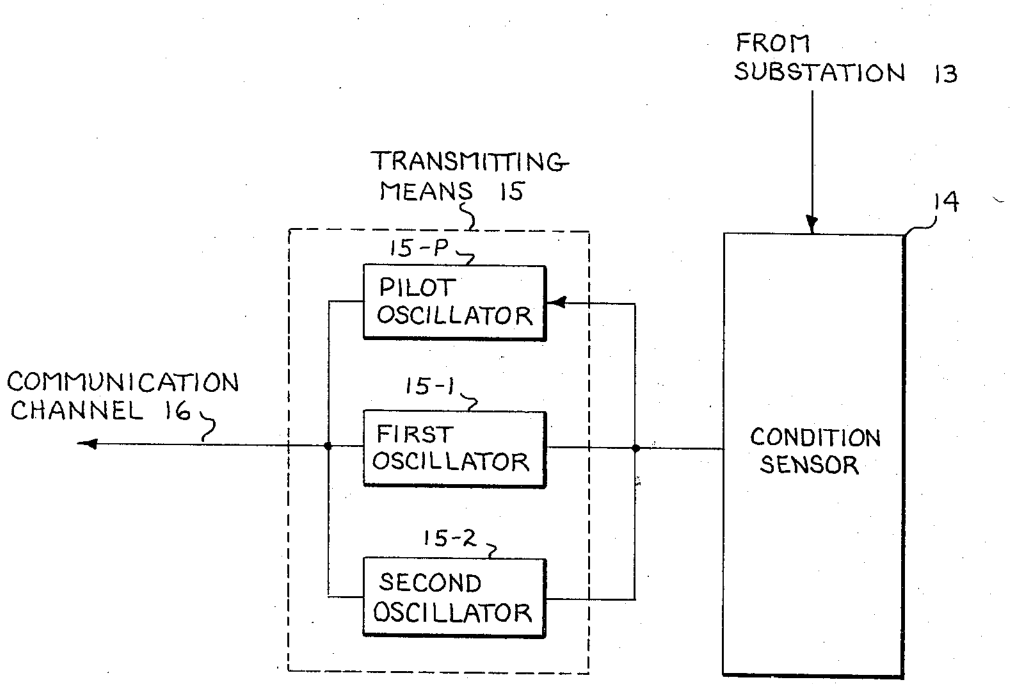
FIG. 2 shows a more detailed block diagram of the transmitting means used in our control system of FIG. 1.

FIG. 2 shows a more detailed block diagram of the transmitting means 15 in accordance with our invention. The communication channel 16 used in our control system is assumed to be a typical voice frequency channel capable of carrying signals from approximately 300 to 3000 Hz. For such a channel, our transmitting means 15 include a pilot oscillator 15-P which produces a relatively stable pilot tone or frequency of 595 Hz, for example. The pilot oscillator 15-P raises the level or magnitude of this pilot tone or frequency in response to a fault or trip indication from the condition sensor 14. The transmitting means 15 also includes a first oscillator 15-1 and a second oscillator 15-2. By way of example, the first oscillator 15-1 either produces a guard tone or frequency of 1615 Hz in response to a normal indication from the condition sensor 14, or produces a trip tone or frequency of 1445 Hz in response to a fault or trip indication from the sensor 14. The second oscillator 15-2 either produces a guard tone or frequency of 2125 Hz in response to a normal indication from the condition sensor 14, or produces a trip tone or frequency of 2295 Hz in response to a fault or trip indication from the sensor 14. The condition sensor 14 either provides a normal indication or a fault or trip indication to the three oscillators 15-P, 15-1, 15-2 simultaneously, and preferably continuously, until the fault condition is removed.

Figure 3:
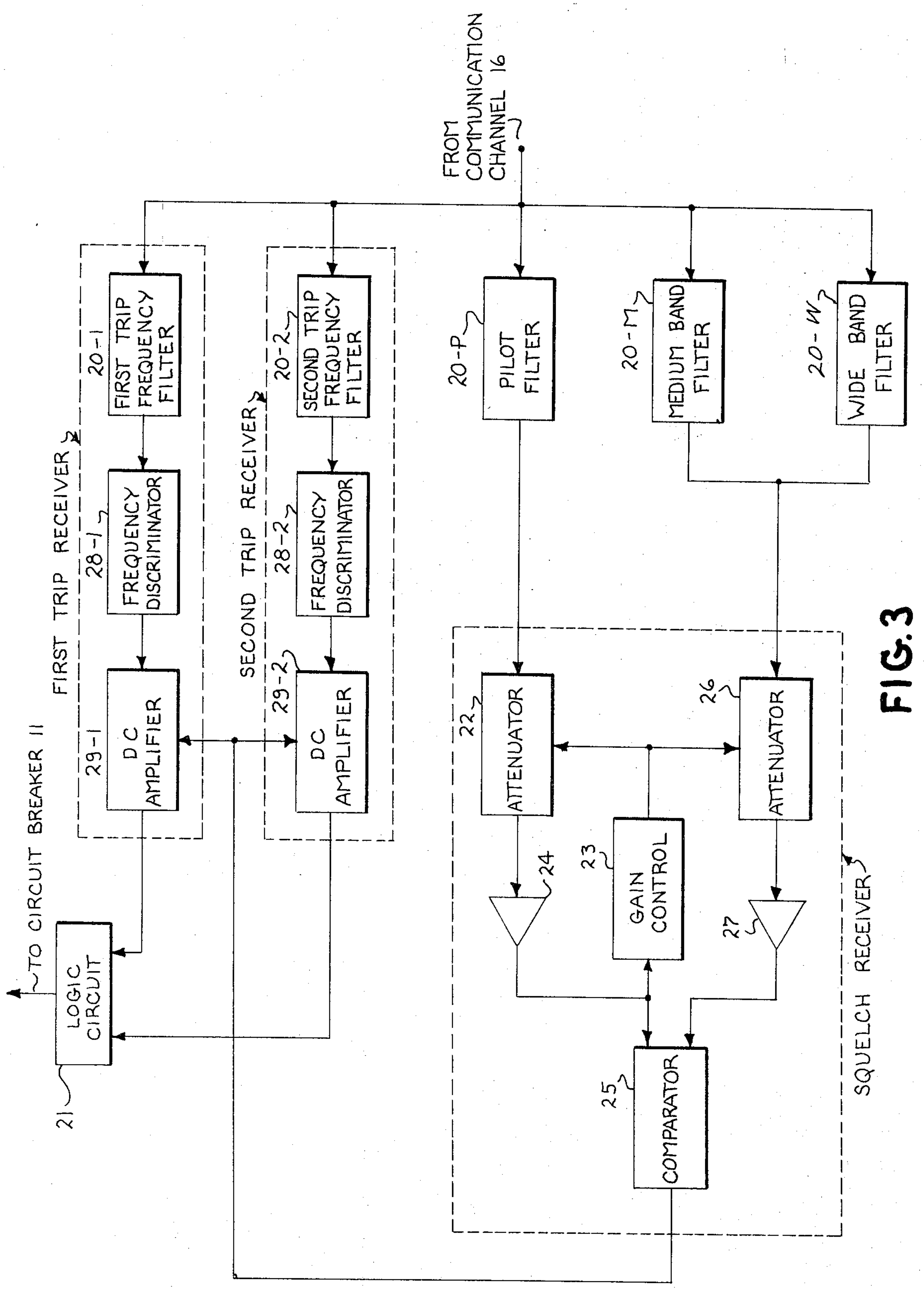
FIG. 3 shows a more detailed block daigram of the receiving means used in our control system of FIG. 1.
Figure 4:
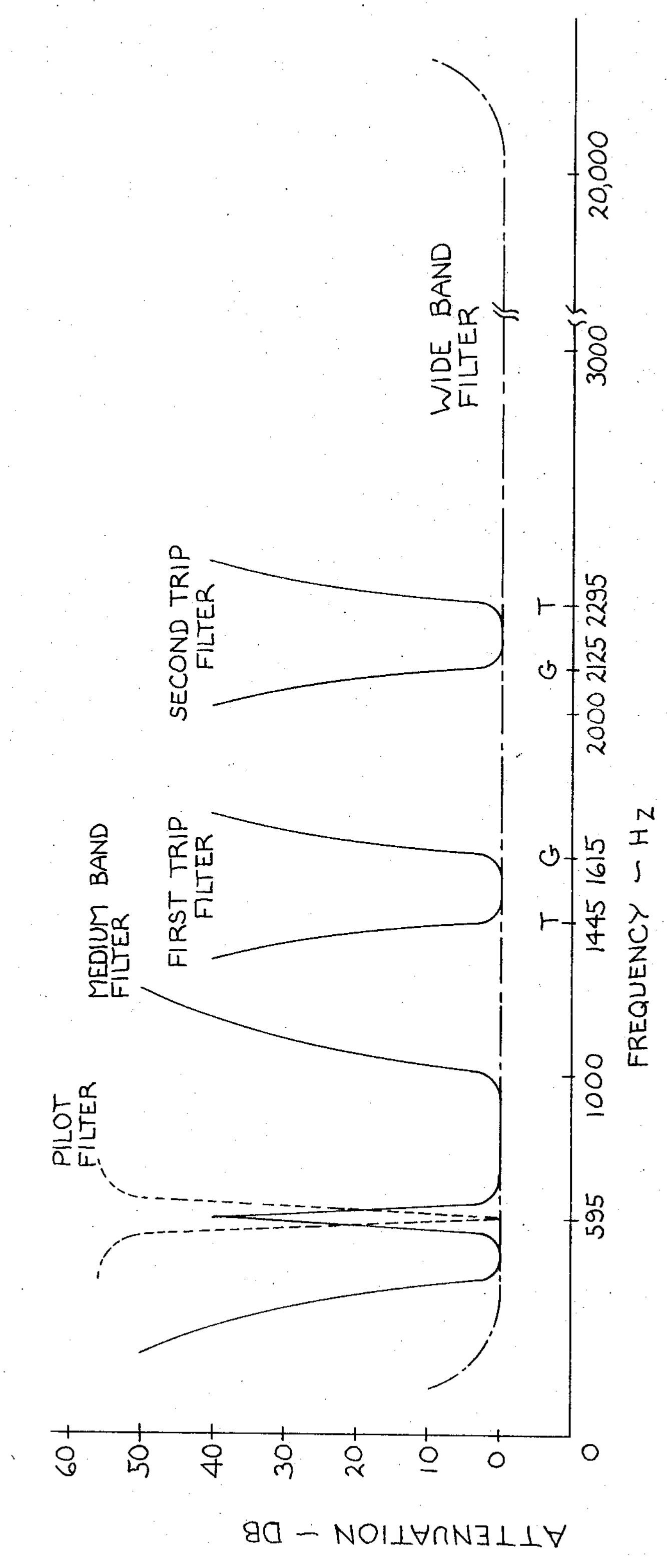
FIG. 4 shows curves illustrating the attenuation-frequency characteristics of the filters used in our receiving means of FIG. 3.

A more detailed block diagram of our receiving means 17 is shown in FIG. 3. The receiving means 17 shown in FIG. 3 is designed and arranged to operate with the frequencies assumed for the transmitting means 15 of FIG. 2. Signals from the communication channel 16 are applied to five filters by a suitable circuit, such as an amplifier with five outputs. These filters comprise a first trip tone or frequency filter 20-1 which, in the assumed example, has a pass-band characteristic that passes the frequencies between 1445 and 1615 Hz, and rejects or attenuates other frequencies; a second trip tone or frequency filter 20-2 which has a passband characteristic that passes the frequencies between 2125 and 2295 Hz and rejects or attenuates other frequencies; a pilot tone or frequency filter 20-P which passes the pilot frequency of 595 Hz and rejects or attenuates other frequencies; a medium band frequency filter 20-M which has a passband characteristic that generally passes frequencies between 300 and 1000 Hz, but that rejects all other frequencies and also rejects the pilot frequency of 595 Hz; and finally a wide band frequency filter 20-W which passes all frequencies between approximately 300 and 20,000 Hz. FIG. 4 shows curves illustrating these filter characteristics. The first and second trip frequency filter characteristics are shown by solid lines at the frequencies between 1445 and 1615 Hz and 2125 and 2295 Hz. The pilot frequency filter characteristic is shown by dashed lines at 595 Hz. The medium band frequency filter characteristic is shown by a solid line between 300 and 1000 Hz. It will be noted that this filter has a sharp rejection characteristic at the pilot frequency of 595 Hz. And the wide band frequency filter characteristic is shown by the dashed and dotted line extending between 300 and 20,000 Hz. As will be explained, the use of these filters provides a more reliable operation in that more frequency or tone conditions must be met in order for the receiving means 17 to produce a trip or operating signal.

With reference to FIG. 3 again, trip signals are utilized in the indicated first and second trip receivers. In these trip receivers, signals which are passed by the trip frequency filters 20-1, 20-2 are applied to respective frequency discriminators 28-1, 28-2 which convert the received tones to direct current signals, for example positive polarity direct current in response to trip tones and negative polarity direct current in response to guard tones. (The negative polarity signals produced in response to the guard tones may be used if desirable.) The positive direct current discriminator signals produced in response to trip tones are applied to respective direct current amplifiers 29-1, 29-2. The amplifiers 29-1, 29-2 are controlled by signals from the squelch receiver. If a squelch signal is present, the amplifiers 29-1, 29-2 are blocked. If no squelch signal is present, the amplifiers 29-1, 29-2 can pass signals to a suitable logic circuit 21. If the logic circuit 21 receives direct current signals indicating reception of both trip tones, the circuit 21 produces an output signal that can, in an assumed example, operate the circuit breaker 11. The logic circuit 21 may include a time delay means if desired to eliminate tripping in response to transients. The logic circuit 21 may comprise a two-input AND gate. The output of the AND gate can be applied to a trip-hold circuit which, after being turned on by the two signals to the AND gate, remains on until reset. Signals from the pilot frequency filter 20-P are applied to an attenuator 22 whose gain is controlled by a gain control circuit 23. Signals from the attenuator 22 are applied to an operational amplifier 24. The output of the amplifier 24 is applied to one input of a comparator circuit 25 and is also applied to the input of the gain control circuit 23. The outputs of the medium and wide band frequency filters 20-M, 20-W are applied to an attenuator 26 which also has its gain controlled by the gain control circuit 23. The output of the attenuator 26 is applied to an operational amplifier 27 whose output is applied to the other input circuit of the comparator 25. The gain control circuit 23 utilizes the pilot frequency signals to control the attenuation of the pilot frequency signals in the attenuator 22 and the attenuation of the medium and wide band signals in the attenuator 26 in a negative feedback fashion. Once the relative levels of the pilot frequency and the medium and wide band frequencies are set, variations in the pilot frequency level cause signals in the attenuators 22, 26 to be varied in a negative feedback fashion as determined by the level of the pilot frequency at the output of the amplifier 24. Thus, if the pilot frequency level increases, the gain control 23 decreases the level of the signals passing through the attenuators 22, 26 a corresponding amount; and if the pilot frequency level decreases, the gain control 23 increases the level of the signals passing through the attenuators 22, 26 a corresponding amount. In FIG. 3, I have shown a dashed line rectangle enclosing the attenuators 22, 26, the gain control circuit 23, the amplifiers 24, 27, and the comparator 25. This rectangle is designated the squelch receiver.

The magnitudes or levels of signals from the two amplifiers 24, 27 are compared in the comparator circuit 25. Actually, the signal supplied by the amplifier 27 is a composite signal representing the signals passed by the medium band frequency filter 20-M and the wide band frequency filter 20-W. The magnitude or level of this composite signal is compared with the magnitude or level of the pilot frequency signal, and if the pilot frequency signal level is not within a predetermined range of the composite signal level, a squelch signal is produced by the comparator 25. This squelch signal blocks the first and second trip frequency receivers so that trip frequency signals from the communication channel 16 cannot be supplied to the logic circuit 21. However, if the pilot frequency level is within the predetermined range of the composite signal level, an unsquelch signal is produced by the comparator 25. This unsquelch signal permits the first and second trip frequency receivers to pass the trip frequency signals to the logic circuit 21 and perform the desired function.

Figure 5:
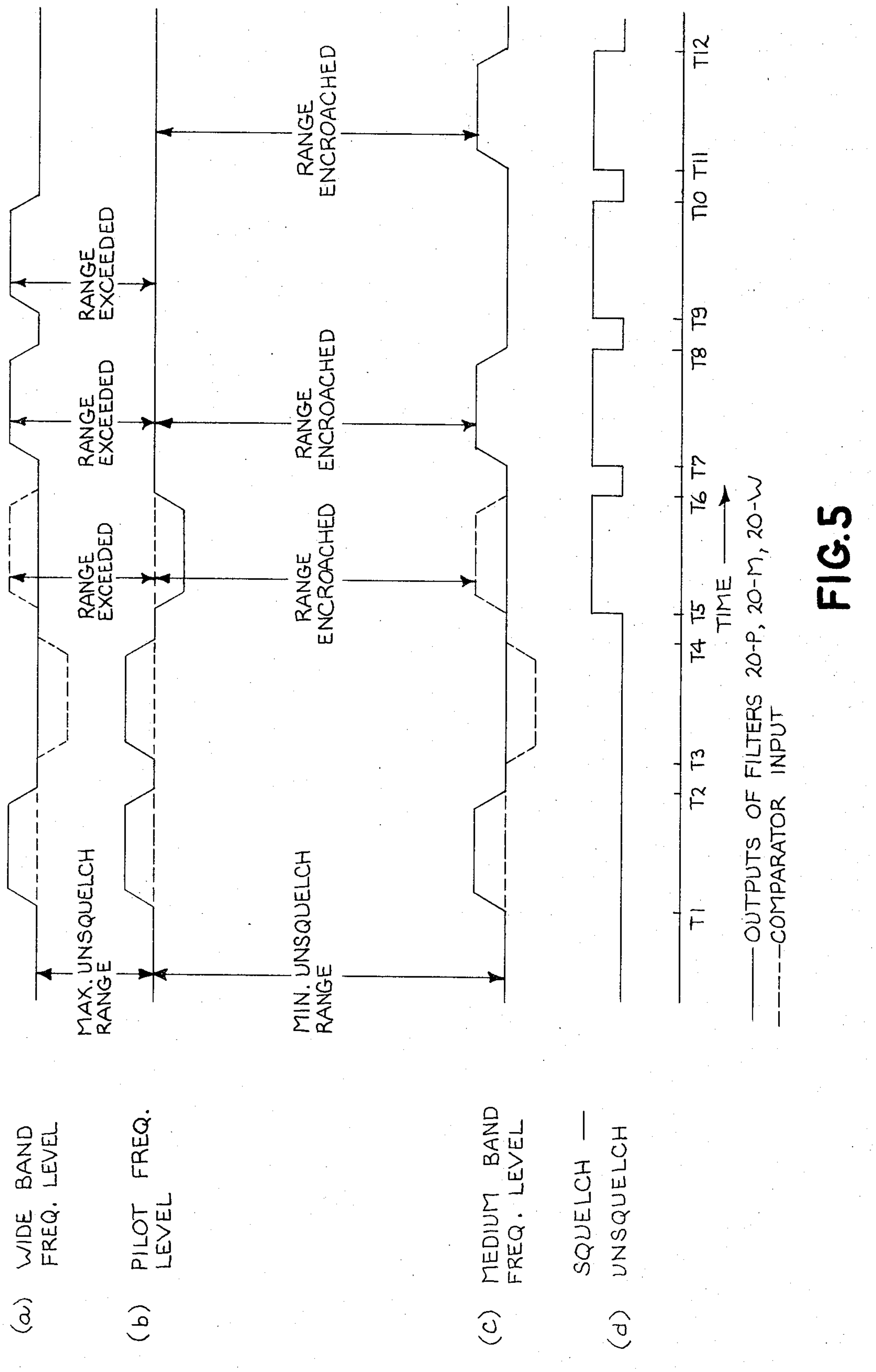
FIG. 5 shows an energy or level diagram for illustrating the operation of our receiving means of FIG. 3.

FIG. 5 shows an energy or level diagram, plotted against time for various assumed conditions, to show the operation of the squelch receiver of FIG. 3. FIG. 5(*a*) shows the level diagram for the wide band frequency signals, FIG. 5(*b*) shows the level diagram for the pilot frequency signals, and FIG. 5(*c*) shows the level diagram for the medium band frequency signals. As mentioned earlier, the comparator 25 compares the pilot frequency level against a composite signal level (made up of the wide band signals and the medium band signals). However, we believe a better understanding of our invention can be had by illustrating and explaining its operation in terms of the wide band signals and medium band signals being separate. Through experience, we have found that the wide band frequency signals are normally at a higher level than the pilot frequency signal because they cover a wider band of energy. Similarly, the pilot frequency signal is normally at a higher level than the medium band frequency signals because of the selectivity of the medium band filter as shown in FIG. 4. In FIGS. 5(*a*), 5(*b*), and 5(*c* ), the solid lines represent the output of the three filters 20-P, 20-M, 20-W, and the dashed lines represent the inputs to the comparator 25 after a change in level by the attenuators 22, 26. If, in FIGS. 5(*a*), 5(*b*), and 5(*c*), no dashed line appears in the level diagrams, this indicates that the attenuators 22, 26 did not change the level of signals from the filters during that time, and that the comparator 25 receives the signals at the same level supplied by the filter. In addition to the three level diagrams, FIG. 5(*d*) shows when the comparator 25 produces a squelch or an unsquelch output in response to the various conditions assumed.

As mentioned above, the wide band frequency level is generally the highest of the three levels involved, since it comprises the greatest energy spectrum. The pilot frequency level is next, and the medium band of frequencies is lowest, since it covers a relatively narrow and hopefully relatively quiet energy spectrum. In a typical communication channel, the three filter outputs would appear as shown in FIGS. 5(*a*), 5(*b*), and 5(*c*) prior to the time T1. We have assumed that if the wide band frequency level does not exceed the pilot frequency level by the designated maximum unsquelch range (which is predetermined), and if the pilot frequency level does exceed the medium band frequency level by the designated minimum unsquelch range (which is also predetermined), then the comparator 25 produces an unsquelch signal. (These predetermined ranges can be set by adjusting the relative inputs to the attenuators 22, 26 during a steady state condition.)

However, if the wide band frequency level does exceed the pilot frequency level by the maximum unsquelch range, then the comparator 25 produces a squelch signal. Or, if the medium band frequency level increases toward the pilot frequency level and encroaches within the minimum unsquelch range, then the comparator 25 will also produce a squelch signal. If a squelch signal is produced, the first and second trip receivers are blocked and no trip frequency signals can pass to the logic circuit 21. The operation of our system will be explained in connection with FIG. 5 under various assumed conditions.

At the time T1, we have assumed that conditions on the communication channel range from the previously assumed normal condition to one where all three levels shown in FIGS. 5(*a*), 5(*b*), and 5(*c*) increase by approximately the same amount. This is indicated by the higher solid line in these figures beginning at the time T1. When the pilot frequency level increases, the gain control 23 causes more attenuation in the attenuators 22, 26 so that the inputs to the comparator 25 remain at approximately the same level as indicated by the dashed line beginning at the time T1. Under this condition, the trip receivers remain unsquelched, since the maximum unsquelch range is not exceeded, and the minimum unsquelch range is not encroached. At the time T2, we have assumed that the channel conditions return to the initial condition.

At the time T3, we have assumed that the pilot frequency voltage level increases for some reason, either because a trip signal is desired or some other reason. This is indicated by the higher solid line in FIG. 5(*b*) beginning at the time T3. This increased signal causes the gain control 23 to introduce negative feedback and attenuate the pilot frequency in the attenuator 22 and the other frequencies in the attenuator 26. Hence, in FIG. 5(*a*) and 5(*c*), the inputs to the comparator are at a lower level as indicated by the dashed line beginning at the time T3. This does not cause a squelch condition, since the wide band frequency level does not exceed the maximum unsquelch range, but actually is lower by this amount of the pilot increase; and because the medium band frequency level does not encroach the minimum unsquelch range, but actually moves further from it. Thus, the pilot frequency signal is now closer to the wide band frequency level and is now farther from the medium band frequency level. This, of course, is an unsquelch condition. At the time T4, we assume that the system returns to the initial condition.

At the time T5, we have assumed that the pilot frequency level drops for some reason, but that the other frequency levels remain constant. When the pilot frequency level drops, th gain control 23 reduces the attenuation and raises the pilot frequency level in the attenuator 22 and the other frequency levels in the attenuator 26. For the pilot frequency, this is shown by the dashed line in FIG. 5(*b*) beginning at the time T5. For the other two signals, this is shown by the dashed lines in FIGS. 5(*a*) and 5(*c*) beginning at the time T5. With respect to the pilot frequency and the wide band frequencies, it will be seen that the input to the comparator 25 now exceeds the maximum unsquelch range, and this would call for a squelch signal. Likewise, with respect to the pilot frequencies in the medium band frequencies, it will be seen that the medium band frequency level encroaches on the minimum unsquelch range. This also would call for a squelch signal. FIG. 5(*d*) shows the squelch condition by the transition of that wave form from the unsquelch to the squelch level beginning at the time T5. This squelch signal blocks the trip frequency receivers so that trip signals connot pass to the logic circuit 21. This is a desirable condition, since the pilot frequency level is not sufficiently high with respect to the other frequencies to permit calling for a trip of the circuit breaker 11. At the time T6, we assume that the circuit conditions return to the initial condition.

At the time T7, we have assumed that channel conditions are such that the wide band frequency level and the medium band frequency level increase but that the pilot frequency level remains constant. Under this condition, the maximum unsquelch range is exceeded and the minimum unsquelch range is encroached, and both these conditions call for a squelch condition beginning at the time T7. At the time T8 we assume that conditions return to the initial condition.

At the time T9, we have assumed that only the wide band frequency level increases, but that the pilot frequency level and the medium band frequency level remain the same. This causes the maximum unsquelch range to be exceeded so that a squelch signal is produced beginning at the time T9. The minimum unsquelch range is not encroached. At the time T10, conditions return to the initial condition. And finally, at the time T11, we have assumed that the medium band frequency level increases, but that other conditions remain the same. This causes the medium band frequency level to encroach on the minimum unsquelch range, so that a squelch signal is produced beginning at the time T11. The maximum frequency range is not exceeded. At the time T12, conditions return to the initial condition.

SUMMARY

It will thus be seen that our control system provides reliable and sure operation for critical and important applications, such as those present for controlling a power line. First, our control system requires that the received pilot signal be at the proper frequency. If the received pilot signal is not at the proper frequency, its level will appear in the medium frequency filter output. This will cause the medium frequency level to encroach on the minimum unsquelch range and squelch the trip receivers. Second, the received pilot frequency level must be within a predetermined range below the wide band frequency level, and beyond a predetermined range above the medium band frequency level. In the actual embodiment of our control system, the maximum unsquelch range for the wide band frequency level was set to be no more than 2 dB above the pilot frequency level, and the minimum unsquelch range for the medium band frequency level was set to be no less than 10 dB below the pilot frequency level. Third, our system requires receiving two trip frequency signals. In FIG. 4, it will be seen that the first trip frequency signal should move downward in frequency and the second trip frequency should move upward in frequency. This provides additional protection against frequency translation, a condition that might be present where the communication channel required heterodyning of the various frequencies. Thus, our system provides sure operation despite wide ranges in signal levels, and provides protection against operation even if frequencies are translated or if as many as two extraneous tones appear on the communication channel. While we have shown only one embodiment, persons skilled in the art will appreciate that modifications may be made. For example, the filters may have various passband characteristics, and the precise frequencies and frequency bands may vary, depending upon the system being used. Similarly, the squelch receiver may take different embodiments. For example, the gain control 23 and attenuators 22, 26 could be eliminated if the amplifiers 24, 27 were replaced with logarithmic amplifiers which tracked each other. Therefore, while our invention has been described with reference to a particular embodiment, it is to be understood that modifications may be made without departing from the spirit of the invention or from the scope of the claims.

What we claim as new and desire to secure by Letters Patent of the United States is:

1. For use with an electrical power system, an improved control system comprising:

a. transmitting means having an output adapted to be connected to a communication channel at a first location on said power system, said transmitting means comprising:
   1. means for transmitting a pilot frequency over said communication channel;
   2. means for transmitting two guard frequencies over said communication channel in response to proper operation of said power system;
   3. and means for transmitting two trip frequencies over said communication channel in place of said two guard frequencies in response to improper operation of said power system;

b. and receiving means having an input adapted to be connected to said communication channel at a second location on said power system, said receiving means comprising:
   1. a narrow band filter connected to said receiving means input for receiving substantially only said pilot frequency from said communication channel;
   2. a medium band filter connected to said receiving means input for receiving a medium band of frequencies other than said pilot frequency from said communication channel;
   3. a wide band filter connected to said receiving means input for receiving a wide band of frequencies from said communication channel;
   4. a squelch receiver having inputs connected to said narrow band filter, said medium band filter, and said wide band filter respectively, said squelch receiver producing an unsquelch signal only in response to receiving said pilot frequency at a level having a predetermined relation with the level of said medium band frequencies and said wide band frequencies, and producing a squelch signal otherwise;
   5. first and second trip frequency filters connected to said receiving means input for receiving said first and second trip frequencies respectively;
   6. output means respectively connected to said first and second trip frequency filters and to said squelch receiver for producing respective trip outputs only in response to said unsquelch signal and in response to said two trip frequencies;
   7. and means connected to said output means for utilizing said trip outputs.

2. The improved control arrangement of claim 1 wherein said squelch receiver further comprises means for controlling the respective levels for said pilot frequencies, said medium band of frequencies, and said wide band of frequencies as an inverse function of the received level of said pilot frequency.

3. The improved control system of claim 1 wherein said pilot frequency transmitting means supplies said pilot frequency at a higher level in response to improper operation of said power system.

4. An improved control arrangement for power lines and the like comprising:

a. input means adapted to be connected to sensing equipment on the power line for receiving a trip signal in response to an undesired condtion on said power line;

b. transmitting means connected to said input means for producing a pilot frequency at a first level, a first guard frequency, and a second guard frequency in the absence of said trip signal; and for producing said pilot frequency at a level higher than said first level, a first trip frequency in place of and higher in frequency than said first guard frequency, and a second trip frequency in place of and lower in frequency than said second guard frequency in response to said trip signal;

c. and output means connected to said transmitting means and adapted to be connected to a communication channel for applying said frequencies to said communication channel.

5. An improved control arrangement for power lines and the like comprising:

a. input means adapted to be connected to a communication channel for receiving signals therefrom, said signals comprising a pilot frequency, first guard and trip frequencies, and second guard and trip frequencies;

b. a pilot filter connected to said input means for passing substantially only said pilot frequency;

c. a medium band filter connected to said input means for passing a relatively small band of frequencies above and below said pilot frequency and for rejecting said pilot frequency;

d. a wide band filter connected to said input means for passing a relatively wide band of frequencies including said small band of frequencies, said pilot frequency, said first trip filter band of frequencies, and said second trip filter band of frequencies;

e. first and second variable attenuators each having an input, an output, and a control;

f. means connecting said first attenuator input to said pilot filter and said second attenuator input to said medium band filter and said wide band filter;

g. a gain control circuit having an input and an output;

h. means connecting said gain control input to said first attenuator output and said gain control output to both of said attenuator controls in a negative feedback fashion;

i. a comparator circuit having two inputs and an output;

j. means respectively connecting said comparator inputs to said first and second variable attenuator outputs;

k. said comparator producing an unsquelch signal at its output in response to said pilot frequency level being within a predetermined compared range of said wide band frequency level and beyond a predetermined compared range of said medium band frequency level, and producing a squelch signal in response to said pilot signal level being beyond said predetermined compared range of said wide band frequency level or being within said predetermined compared range of said medium band frequency level;

l. a first trip filter having an input connected to said input means and having an output for providing substantially only said first guard and trip frequencies and the band of frequencies therebetween;

m. a second trip filter having an input connected to said input means and having an output for providing substantially only said second guard and trip frequencies and the frequency band therebetween;

n. first and second frequency discriminators each having an input and a trip frequency output;

o. means respectively connecting said first and second discriminator inputs to said outputs of said first and second trip filters;

p. means connecting said comparator output to said discriminators for blocking signals at said discriminator trip frequency outputs in response to a squelch signal and for passing signals at said discriminator trip frequency outputs in response to an unsquelch signal;

q. and means connected to said discriminator trip frequency outputs for producing a utilization signal for tripping a circuit breaker or the like in response to the simultaneous occurrence of signals at said discriminator trip frequency outputs.

6. The improved control arrangement of claim 5 and further comprising:

a. input means adapted to be connected to sensing equipment on the power line for receiving a trip signal in response to an undesired condition on said power line;

b. transmitting means connected to said input means for producing a pilot frequency at a first level, a first guard frequency, and a second guard frequency in the absence of said trip signal; and for producing said pilot frequency at a level higher than said first level, a first trip frequency in place of and higher than said first guard frequency, and a second trip frequency in place of and lower than said second guard frequency in response to said trip signal;

c. and output means connected to said transmitting means and adapted to be connected to a communication channel for applying said frequencies to said communication channel.

* * * * *

UNITED STATES PATENT OFFICE

CERTIFICATE OF CORRECTION

Patent No. 3,852,532 Dated December 3, 1974

Inventor(s) Ronald L. Giles and Daniel L. Wetherell

It is certified that error appears in the above-identified patent and that said Letters Patent are hereby corrected as shown below:

| | |
|---|---|
| Col. 2, line 27 | cancel "side" and insert -- wide -- |
| line 49 | cancel "con" and insert -- can -- |
| Col. 4, line 1 | cancel "ooen" and insert -- open -- |
| Col. 7, line 53 | cancel "th" and insert -- the -- |
| Col. 8, line 4 | cancel "connot" and insert -- cannot -- |

Signed and sealed this 4th day of March 1975.

(SEAL)
Attest:

RUTH C. MASON
Attesting Officer

C. MARSHALL DANN
Commissioner of Patents
and Trademarks